(12) United States Patent
Olejnik

(10) Patent No.: US 12,435,395 B2
(45) Date of Patent: Oct. 7, 2025

(54) COMPOSITE MATERIAL BASED ON ALLOYS, MANUFACTURED IN SITU, REINFORCED WITH TUNGSTEN CARBIDE AND METHODS OF ITS PRODUCTION

(71) Applicant: INNERCO SP. Z O.O, Cracow (PL)

(72) Inventor: Ewa Olejnik, Skala (PL)

(73) Assignee: Innerco SP. Z.O.O., Cracow (PL)

( * ) Notice: Subject to any disclaimer, the term of this patent is extended or adjusted under 35 U.S.C. 154(b) by 335 days.

(21) Appl. No.: 17/606,889

(22) PCT Filed: Apr. 30, 2019

(86) PCT No.: PCT/PL2019/050028
§ 371 (c)(1),
(2) Date: Oct. 27, 2021

(87) PCT Pub. No.: WO2020/222662
PCT Pub. Date: Nov. 5, 2020

(65) Prior Publication Data
US 2022/0213581 A1  Jul. 7, 2022

(51) Int. Cl.
| | | |
|---|---|---|
| C22C 29/08 | (2006.01) | |
| B22D 19/02 | (2006.01) | |
| B22F 7/06 | (2006.01) | |
| C22C 1/051 | (2023.01) | |
| C22C 1/10 | (2023.01) | |

(52) U.S. Cl.
CPC ............. *C22C 29/08* (2013.01); *B22D 19/02* (2013.01); *B22F 7/06* (2013.01); *C22C 1/051* (2013.01); *C22C 1/1036* (2013.01); *C22C 1/1057* (2023.01)

(58) Field of Classification Search
CPC .................................................. C22C 29/08
See application file for complete search history.

(56) References Cited

U.S. PATENT DOCUMENTS

| | | |
|---|---|---|
| 2007/0090169 A1 | 4/2007 | Poncin et al. |
| 2017/0022588 A1 | 1/2017 | Tang et al. |

FOREIGN PATENT DOCUMENTS

| | | |
|---|---|---|
| CL | 201801259 | 10/2018 |
| CN | 101664809 A | 3/2010 |

(Continued)

OTHER PUBLICATIONS

A. S. Shchukin et al., "Evolution of Gases during SHS of TiC", International Journal of Self Propagating High Temperature Synthesis, vol. 24, No. 4, 2015, pp. 226-229.

*Primary Examiner* — Christopher S Kessler
(74) *Attorney, Agent, or Firm* — GableGotwals

(57) ABSTRACT

A composite material is disclosed based on in situ produced alloys, especially iron based alloys, reinforced with tungsten carbide in the form of crystals and/or particles, that can be characterized by the fact that the microstructure of the composite material within the composite layer and/or the composite zone comprises faceted crystals and/or faceted particles tungsten carbide that provide uniform macroscopic and microscopic distribution, wherein the crystals and/or particles of tungsten carbide include irregular and/or round and/or oval nano and/or micro-areas filled with alloy based on metal. Compositions of powders used to produce the composite material and methods of its production as well as to cast working element made of such composite materials or using the method are disclosed.

4 Claims, 13 Drawing Sheets

(56) References Cited

FOREIGN PATENT DOCUMENTS

| | | | |
|---|---|---|---|
| CN | 102423799 A | * | 4/2012 |
| CN | 102423799 B | | 2/2013 |
| CN | 109019603 A | | 12/2018 |
| JP | S53144802 A | | 12/1978 |
| JP | 2019501026 A | | 1/2019 |
| RU | 2414992 C2 | | 3/2011 |
| WO | 2017081665 A1 | | 5/2017 |

* cited by examiner

COMPOSITE MATERIAL BASED ON ALLOYS, MANUFACTURED IN SITU, REINFORCED WITH TUNGSTEN CARBIDE AND METHODS OF ITS PRODUCTION

CROSS-REFERENCE TO RELATED APPLICATIONS

This United States application is the National Phase of PCT Application No. PCT/PL2019/050028 filed 30 Apr. 2019 which is incorporated herein by reference.

BACKGROUND OF THE INVENTION

The invention is related to a composite material based on alloys, manufactured in situ, especially on alloys based on iron, reinforced with tungsten carbide particles of increased wear resistance. The material is especially suitable for production of the wear parts. The subject of the invention is a method of production of the said composite material in the form of a composite layer and in the form of a composite zone using reactive components, i.e. compact and liquid casting coating.

One of significant problems related to the frequency of replacement of machines part is the excessive wear of their surface. Such wear translates to losing the initial dimensions and shape causing deterioration or total loss of functional features of a given structural element. This necessitates frequent replacement of these elements what reduces profitability of the machines and devices users. This common phenomenon leads to designing functional elements of machines with hardened outer layer. Thickness and shape of the wearing area depend on the operating conditions of a given detail and may be even a several tens of millimetres. This problem mostly concerns such industry sectors as mining, cement, metallurgy, power, agriculture, offshore, recycling, processing, where the abrasion is the basic physical phenomenon enabling implementation of a given process, e.g. crushing, fragmenting, milling, drilling, boring, loading, transferring, including wing and tides energy, transport of solid of liquid substances of mixes thereof.

There are many known material solutions in the art that allow for protecting structural elements by increasing the wear resistance. They mostly include various types of cast alloys and alloys for metal forming. Solutions aimed at producing functional casts are more often applied, i.e. having hard and wear resistant outer layer and more plastic core. Within this sector, materials applied using welding, laser and plasma techniques are predominating. The distinguishing feature of the abrasive materials most resistant to wear is the high content of ceramic phases, mostly carbides arranged within a properly selected matrix based on metal or metal alloys. The most wear resistant materials include in their microstructure ceramic phases in the form of titanium carbide (TiC), tungsten carbide (WC) of the mixes thereof, in amount not exceeding 50% by volume. High volume share of the mentioned types of carbides causes that the materials applied on the machines parts of semi-finished products show better resistance to wear comparing to the most abrasion resistant casting alloys or these designed for metal forming.

However, using state of the art technologies is expensive and time-consuming because of the costs of using two or more technological processes and a series of intermediate operations in order to produce a final detail. The other important drawback of the padding and alloying technologies known in the art, is the practical lack of the option or difficulties in applying the layers or coatings resistant to abrasive wear at difficult to reach locations or in places of complicated shapes, e.g. bent pipes, casts of complicated internal and external shape. Roughness of padded surfaces is relatively high, which fact in many cases is a limitation in using this group of methods in production of wear resistance elements of machines and devices. Another significant drawback in production of abrasive wear resistance layer using welding techniques is the need to previously prepare a surface where the layer is to be applied on. Incorrectly prepared surface causes embrittlement of the applied material. At the same, in case of percussion applications, one may often observe embrittlement of fragments of the applied materials, which fact leads to reduction of the life.

There are other solutions known in the art that increase the resistance to abrasive wear of the outer layer of machines and devices elements, wherein the composite layers reinforced with ceramic phases, e.g. TiC, are made in situ, directly during the casting process. They consist in applying a coating comprising a mixture of powders, substrates of the TiC formation reaction and fluid, i.e. alcohol, on the mould cavity and then the mould is subjected to drying and filling with liquid alloy based on iron. Such method is presented in the Polish patent application PL414755 A. The solutions allows for creating a composite layer within the cast, reinforced with oval TiC crystals or particles, however the layer obtained using this method is not continuous and uniform and may have numerous defects in the form of gaseous roughness. The problem results from the fragmentation and gas emission phenomenon that accompany the reaction of synthesis of pure TiC. The problem of gas emission during SHS reactions is discussed in the paper of Shchukin (Shchukin A S, Savchenko S G (2015). *International Journal of Self-Propagating High-Temperature Synthesis*, 24, pp. 227-30), where it is proven that within the first SHS TiC reaction, there is rapid degassing of compacted Ti and C powders together with the release of significant volumes of gases. This leads to encapsulating the released gases during crystallization of the alloy in the form of bubbles forming roughness within the zone of composite layer. Increase of the alloy temperature within the reaction area is a result of the release of a thermal energy that accompanies highly exothermic TiC synthesis reaction, enthalpy of creating this phase is −187 kJ/mole. For comparison purposes, enthalpy of forming WC is −32 kJ/mole, copper (Cu) only −13 kJ/mole. Unfavourable phenomenon of fragmentation is discussed in the international patent application WO2017081665 concerning in situ production of TiC reinforced composite zones within the castings. It discloses that reactive infiltration during TiC synthesis, at the presence of liquid alloy, leads to separation of the composite zone fragments which then are shifted within the mould cavity. In extreme cases, it affects total destruction of the local reinforcement or causes increase of the volume of the matrix at the cost of TiC particles. This phenomenon is defined as composite zones fragmentation. Presence of roughness and non-uniformity of phases displacement reinforced within the composite layer area affects deterioration of hardness and resistance to abrasive wear.

State of the art presents also the European patent application EP2334836 B1 that discloses a composite material of hierarchic structure that includes iron based alloy reinforced with oval particles of TiC according to predefined geometry, wherein the reinforced part includes alternating macro-structure of millimetre zones enriched with micrometric agglomerates of spherical TiC particles separated by millimetre zones basically deprived to micrometric spherical TiC zones, wherein such enriched micrometric spherical TiC particles form a microstructure, where micrometric gaps between these spherical particles are also filled by the iron based alloy. The above application also discloses a method of producing through casting a composite material of hierarchic structure.

The international patent application PCT/IB2016/056825 discloses a material and method of its production consisting in obtaining composite zones in situ in the castings using SHS reaction substrates that include a moderator in the form of metal powders mix. The moderator acts in this solution as a stabilizer and prevents destructive phenomenon of fragmentation of the composite zones reinforced with TiC and enables producing the composite matrix of specific design properties. This solution allows for obtaining a composite zone of uniform macroscopic distribution of reinforcement phase particles, high resistance to wear and relatively low roughness. However, addition of the moderator introduced to the substrates of the reaction forming the carbides subject to SHS reaction causes the reduction of their volume within the obtained zone which fact in turn causes the drop of resistance to abrasive wear. Moreover, in case of the WC formation reaction, addition of the moderator including Fe causes formation of brittle phase eta, e.g. of type $Fe_2W_2C$. Therefore, in the solution according to the invention, one surprisingly achieved results confirming that it is possible to produce stable composite zones based on WC in situ in the castings, wherein the addition of the moderator is not necessary. The material according to the invention includes stable zone or composite layer reinforced with particles and/or crystals of WC carbide of unexpected characteristic morphology. This atypical morphology causes very good bonding of the carbide particles with the matrix, as confirmed by the presence of irregular oval area that include the alloy. These areas are formed during the growth of the crystal and/or particle in situ in the liquid alloy and are encapsulated, absorbed by the growing crystal and/or particle and are related to formation of liquid solutions of specific composition during WC synthesis reaction. No addition of the moderator comprising Fe drastically limits the share of brittle phases of eta type, what affects very high resistance to wear and impact strength of such material. At the same time, the material produced according to the invention includes very low level of microporosity amounting up to 2% by volume, comparing to other solutions known in the art. This means that composite material according to the invention has unexpectedly high strength to bending and resistance to abrasive wear.

BRIEF SUMMARY OF THE INVENTION

The objective of the invention is to develop a composite material reinforced with tungsten carbide particles that can be characterized with increased hardness and resistance to abrasive wear within the operating surfaces by obtaining evenly distributed hard and wear resistant crystals/particles of tungsten carbide in it. At the same time, the invention solves the problem of fragmentation and high infiltration that accompanies the TiC in situ synthesis reaction. Both these phenomena may cause damage to the composite layer when it comes to total fragmentation or significantly reduce the TiC particles content within the zone due to high degree of infiltration, which cannot be physically avoided due to highly exothermic character of the TiC synthesis reaction. During the in situ TiC synthesis, the amount of infiltration of liquid alloy within the composite zone can be limited using certain methods, however the final volume of TiC carbide shall never reach such level than can be reached using compounds and methods according to the invention in case of tungsten carbide. This is a technical progress in the field of producing abrasive resistant composite layers and zones reinforced with tungsten carbide resistant in the case wear parts of machines, devices and semi-finished products. According to the invention, methods of producing composite materials reinforced with tungsten carbide particles of specific morphology are also proposed. Solution according to the invention consisting in in situ production, i.e. directly in the mould within a single stage process, of composite materials reinforced with evenly distributed particles and/or crystals of tungsten carbide or mixture of different types of tungsten carbides that eliminates the aforementioned drawbacks.

The objective of the invention is a composite material based on in situ produced alloys, especially iron based alloys, reinforced with tungsten carbide in the form of crystals and/or particles, that can be characterized by the fact that the microstructure of the composite material within the composite layer and/or the composite zone containing faceted crystals and/or particles of tungsten carbide that provide uniform macroscopic and microscopic distribution, wherein the crystals and/or particles of tungsten carbide include irregular and/or round and/or oval nano and or/micro-areas filled with alloy based on metal.

Preferably, irregular and/or oval and/or round nano and/or micro zones filled with an alloy based on metal are located within the internal part of the crystals and/or particles of tungsten carbide, and within the external part, near the walls, their structure is uniform, and the crystal and/or particles are formed in situ within liquid alloy and are present within the matrix, the said matrix is formed after the alloy crystallization process.

Preferably, the volume of at least on type of tungsten carbide within the composite material is 15 to 90% by volume, especially between 25 and 75% by volume.

Preferably, the size of crystals and/or particles of tungsten carbide within the composite material according to the invention is between 0.5 and 30 µm.

Preferably, within the area of tungsten carbide within the composite material according to the invention, size of the areas filled with metal or alloy is between 0.1 and 4.5 µm.

Preferably, the composite material according to the invention includes additional types of tungsten carbide or borides subjected to self-propagating high-temperature synthesis reaction, especially TiC, MoC, NbC, ZrC, VC, TaC, TaB, TiB2 or the mixes thereof, except for SiC, which is thermodynamically unstable in iron based alloys and is dissolved in them.

The subject of the invention is also the mix of powders for producing composite material according to the invention, comprising tungsten within the range 90-97% wt. and carbon, especially in the form of high purity carbon or other carrier of its high content or the mixes thereof within the scope 3-10% wt., preferably tungsten within the scope 93-95% wt., and carbon within the scope 5-7% wt., preferably tungsten in the amount of about 94% wt. and carbon in the form of graphite in amount about 6% wt.

The invention includes also the mix of powders for production of the composite material according to the invention that includes:
  a) tungsten powder, especially in the form of microcrystalline powder or nanoparticles agglomerates or other carrier of high tungsten content, b) carbon powder, especially in the form of graphite or other carrier of high carbon content or their mixtures, and c) catalyst in the form of substrates of carbon forming reactions, other than WC or boride, which are subject to self-propagating high temperature synthesis reaction, especially TiC, MoC, NbC, ZrC, VC, TaC, TaB, $TiB_2$ or the mixtures thereof, except for SiC.

According to this aspect, the object of the invention is also the method of producing of the composite material in the form of a composite layer including the following stages:

a) coating the mould cavity or core, especially sand core, with reactive liquid casting coating that includes a mixture of powders according to the invention and a carrier, b) drying, especially at temperature equal to or above 100° C., c) pouring the cast mould cavity with an alloy, especially iron based alloy, wherein heat supplied by the liquid alloy in the form of high temperature provides the energy necessary to initiate the in situ reaction of the ceramic phase in the form of at least one type of tungsten carbide or tungsten carbide with addition of other types of carbides that are subject to self-propagating high temperature synthesis reaction and represent a catalyst for the tungsten carbide synthesis reaction.

Preferably, in the method according to the invention, the carrier is a solution of a solvent with addition of a polymer, more preferably, the solvent is alcohol, especially ethyl alcohol and most preferably, the polymer is a resin of low gas producing potential, especially colophony.

Preferably, in the method according to the invention, surface density of the reactive cast coating is within the range from 0.29 to 2 g/cm2, more preferably from 0.29 to 0.6 g/cm2, the most preferably it is 0.5 g/cm2.

Preferably, in the method according to the invention, percentage share of the powder mixture representing substrates of the reaction forming tungsten carbide to the carrier is 6:1 to 1:1, more preferably 4:1.

According to another aspect, the object of the invention is also the method of producing of the composite material in the form of a composite zone including the following stages:

a) preparation of powder mixture according to the invention, b) pressing the powder mix in the form of a casting pad that may have different forms, preferably granules, briquettes, preforms or compacts, c) insertion of at least one casting compacts within the casting mould cavity using installation elements, d) pouring the cast mould cavity with an alloy, especially iron based alloy, wherein heat supplied by the liquid alloy in the form of high temperature provides the energy necessary to initiate the in situ reaction of the ceramic phase in the form of at least one type of tungsten carbide or tungsten carbide with addition of other types of carbides that are subject to self-propagating high temperature synthesis reaction and represent a catalyst for the tungsten carbide synthesis reaction.

Preferably, pressure of the reagent pressing is between 100 and 650 MPa, preferably 250 and 600 MPa, most preferably 460 and 550 MPa, wherein especially when the pressure is obtained using compaction methods, especially using cold isostatic pressing, one or two-axis cold pressing.

The invention is also related to a cast structural element comprising the composite material according to the invention or produced according to the invention.

One of the most common method of in situ production of composites is the Self-propagating High-temperature Synthesis (SHS). The method is the basic method of producing composite materials in the powder metallurgy. However, despite many advantages including the low energy input necessary to initiate the ceramic phases syntheses and high output, the obtained products are characterized by high degree of porosity that significantly reduces mechanical and utility properties of the manufactured products. Therefore, there have been research works performed related to binding the SHS method with the conventional casting techniques, wherein the synthesis reaction initiation factor is high temperature of liquid cast alloy poured in the mould cavity. Application of such coupled methods allows for obtaining products deprived of casting defects that can be characterized by a very good binding at the ceramic—die phases boundary, deprived of inclusions, roughness and with high mechanical properties, and at the same time manufactured within a single-stage technological process. As a result of the research work, the composite material reinforced with tungsten carbide particles was unexpectedly obtained that is produced using a method according to the invention, using liquid reactive coatings and reactive casting compacts.

In case of the composite layers, the technological process of their obtaining includes production of reactive casting coating that include reactants forming the ceramic phase in the form of tungsten carbide or tungsten carbide with addition of other reactants subject to SHS reaction. Supply of heat necessary for the ceramic phase in situ synthesis reaction to take place is obtained through introduction of liquid cast alloy into the mould cavity. High temperature of liquid metal favours the SHS reaction of tungsten carbide within the composite layer/coating area. The composite reinforcement made in situ in the form of composite layer can be characterized by a microstructure represented by particles or crystals of tungsten carbide of characteristic morphology. They are separated from each other with the matrix areas formed after crystallization of liquid alloy poured into the mould cavity. This phenomenon is a result of reactive infiltration of the reactive coating applied on the mould cavity by the liquid casting alloy.

According to the invention, there is also a method of producing a composite material reinforced with tungsten carbide particles, by application of the reactive casting compacts. At least one compact is inserted in the place of the mould cavity, which under actual conditions shall reflect the cast area locally reinforced with the composite zone. The synthesis reaction of the ceramic phase in the form of tungsten carbide particles is initiated by high temperature of casting alloy. The supply of enough heat contributes to initiation of the SHS reaction of tungsten carbide within the area of the compact. The composite reinforcement made in situ in the form of the composite zone can be characterized by uniform microstructure represented by particles or crystals of tungsten carbide of characteristic morphology, arranged within the matrix based on alloy, especially iron based alloy with carbon and other elements. However, the volume of ceramic phase is significantly higher comparing to the composite layer. The layer is made by application of liquid reactive coating without high pressure that leads to increase of the reagents powder density. This affects less share of WC crystals after the synthesis reaction and alloy crystallization within the composite layer according to the invention. The composite zone reinforced with tungsten carbide or other types of carbides and/or borides subject to SHS reaction, comprising the matrix, wherein the said matrix is formed after crystallization of the alloy and is the consequence of a controlled process of reactive infiltration that takes place during the synthesis reaction. The controlled process of infiltration according to the invention is performed by proper selection of pressure and powder compaction method, their form and chemical composition of the powders mix. Within the scope of the mix composition, a catalyst in the form of substrates of reaction forming other types of carbides and borides is added to the substrates of reaction forming tungsten carbide in proper stoichiometry. The parameters such as powders compaction pressure, form of compacted powders, chemical composition of the powders mix, represent parameters that allow or producing composite zones in situ in the cast parts of machines, devices and semi-finished products of different shape and weight.

The mix of powders representing substrates of reaction forming tungsten carbide is prepared in a predetermined stoichiometry. Preferably, the mix of powders wherein the mass fraction of tungsten is between 90 and 96%, and the rest is in the form of graphite or a carrier of high carbon content or mixtures thereof. More preferably, the mixture of powders representing substrates for creating tungsten carbide amounts about 94% wt. of tungsten and about 6% wt. of carbon in the form of graphite or other carrier of high carbon content or mixtures thereof. The prepared powders mixtures are subjected to homogenization process in order to homogenize the properties within the whole mixture volume. Within another step, they are subjected to drying, preferably at temperature at least 100° C. in order to eliminate alcohol and moisture absorbed on powders surface. Depending on the selected method of producing a material reinforced with WC particles, they represent based material to produce reactive casting coatings and casting compacts.

The term reactive casting coating means the mixture of powders comprising substrates of the carbides and/or borides formation reactions that are subject to SHS reaction, the components of which are represented by powders of graphite and tungsten and a carrier. Preferably, beside the powders of tungsten and graphite and the carrier, the reactive coating may include other additives in the form of substrates of the reaction forming titanium carbide or other carbides and/or borides, with the exception of SiC. The technological process of forming the composite material with the application of the reactive cast coatings, includes: preparation of a weighed amount of ceramic phase forming substrates powder homogenized within the whole volume; then, alcohol solution with an addition a polymer, e.g. colophony which is used as an air-drying gluing agent and affects the physical, chemical and technological properties of the coatings is added to the powder mixture; next, at least on layer of the obtained composition, representing the cast coating is being applied on the cast core or into the casting mould cavity using a brush, immersion or spray, wherein, at the initial stage of the process, each of the applied layers or all together is dried in order to eliminate the thermal decomposition products of the applied solvent and additives. Then, the cavity of the casting mould without or with the casting core is filled with the selected material from among the group of iron based alloys with carbon and other elements, preferably of chemical composition of cast irons and cast steels, however the synthesis reaction is conditioned by suitable temperature of the basic alloy and its proper construction of the filling arrangement. Similarly, instead of using iron based alloys, it is possible to use other alloys, including preferable casting alloys, e.g. based on cobalt or nickel, wherein the synthesis reaction can be initiated. The key parameter of the process is the heat balance between the reactive cast coating applied on the mould cavity and/or core, which includes powders of WC forming reaction substrates, and the liquid alloy in the casting and its selection so that the heat amount allows for initiating the reaction. When the amount of heat within the mould cavity is not enough, the WC synthesis reaction is not going be initiated and the composite layer reinforced with WC shall not form in the cast. The heat balance parameter should be determined experimentally or empirically for a given type of cast of specified weight and shape. Application of a catalyst in the form of substrates of TiC formation reaction with predefined percentage share is to support the WC synthesis reaction course, increase the amount of the generated energy during reaction, which fact provides for the option of creating thicker layers and better bound with the structural elements as a result of the infiltration. The amount of substrates of the reaction forming TiC as a catalyst of the reaction forming WC must be selected experimentally or empirically for a given shape or weight of the cast. The role of the catalyst can be played by the substrates of a reaction forming carbide other than TiC or boride that are subject to self-propagating high temperature synthesis reaction, especially TiC, MoC, NbC, ZrC, VC, TaC, TaB, $TiB_2$. From among the carbides, SiC cannot be the catalyst because it is thermodynamically unstable, among other things for the group of iron based alloys.

Parameter that defines the amount of casting coating applied on the casting mould cavity or casting core is the surface density that should be interpreted as a weight of the cast coating to the area expressed in $g/cm^2$. Surface density of the applied reactive cast coating according to the invention is within the range from 0.29 $g/cm^2$ to 2 $g/cm^2$, preferably from 0.29 to 0.6 $g/cm^2$, the most preferably it is 0.5 $g/cm^2$.

Mass fraction of the powder mixture representing the tungsten carbide forming reaction substrates is from 1 to 6 parts by weight to 1 parts by weight of the carrier. More preferably, the mass ratio of the mixture representing the tungsten carbide forming reaction substrates to the carrier is 4:1.

The carrier was developed in order to increase adhesion of the coating to the casting mould cavity. The carrier can be a solution of a binder in the form of a polymer of low degree of gas production potential within the solvent in the form of an alcohol of percentage concentration between 1 and 10% wt. The best results were achieved with the carrier composed of 10% solution of colophony with ethyl alcohol. Application of materials characterizing with low degree of gas emission during thermal decomposition prevented formation of porosity within the composite layer area.

The casting pad is a pressed under pressure mix of tungsten carbide substrates in the form of graphite or tungsten. The technological process of creating the composite material with application of the insert includes: preparation of weighed amount of substrate powders forming the ceramic phased of MeC type homogenized within the whole volume, where Me is metal, C is carbon, then the powders weighed amount is subjected to cold pressing with the application of one-axis presses or isostatic pressing method, wherein the produced, at least one, casting pad of proper dimensions is inserted within the casting mould cavity or on the core using installation system elements in the form of nails, bolts, metal baskets, leading to integration of the whole system with the casting process. Finally, the prepared casting mould without/with the core is filled with the selected casting alloy, most preferably from among the group based on Fe, wherein the synthesis reaction is conditioned by proper temperature and proper structure of the filling arrangement. The application of the additives in the form of substrates forming TiC is to support the WC synthesis reaction by supplying additional energy in the form of TiC synthesis reaction heat. Selection of the amount of additives depends on the weight, shape of the cast and base alloy and must be determined each time experimentally in order to obtain the required energy within the cast, which is necessary to initiate the synthesis reaction. According to the invention, the casting mould together with compact installed in it, after filling with liquid alloy is treated as a reactor of in situ synthesis of carbides.

BRIEF DESCRIPTION OF THE DRAWINGS

The invention is presented in embodiments that do not limit the protective scope of the invention and on the following figure, wherein.

DESCRIPTION OF THE INVENTION

Example 1

Figure 2:
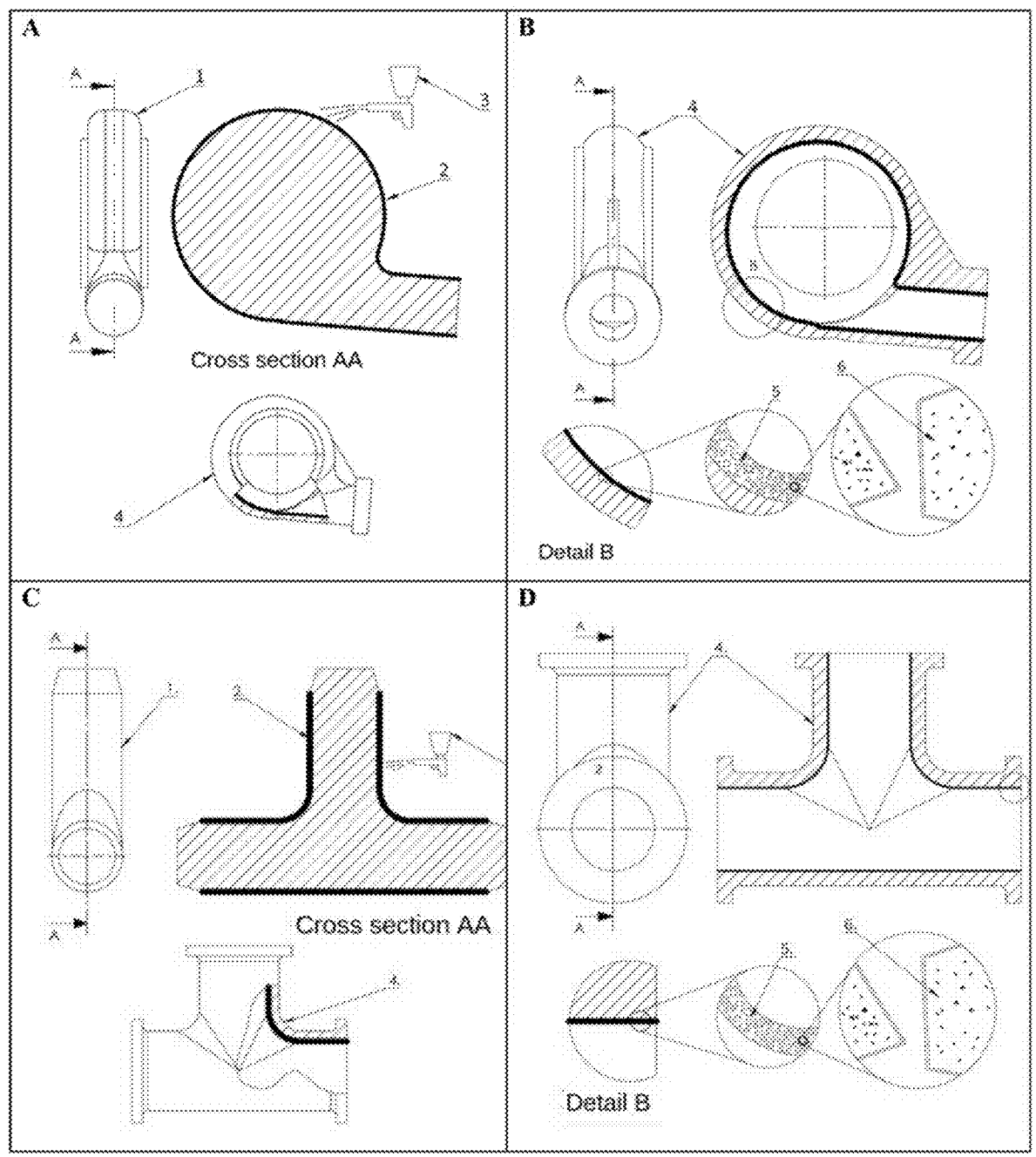
FIG. 2 presents a cross-section of the core representing an element of the casting mould for producing a casting of a pump body with the applied reactive casting coating (a) and diagram of a pump body (b) with the in situ produced composite layer reinforced with tungsten carbide of characteristic morphology as well as diagrams concerning tee-section (c, d)
Figure 3:
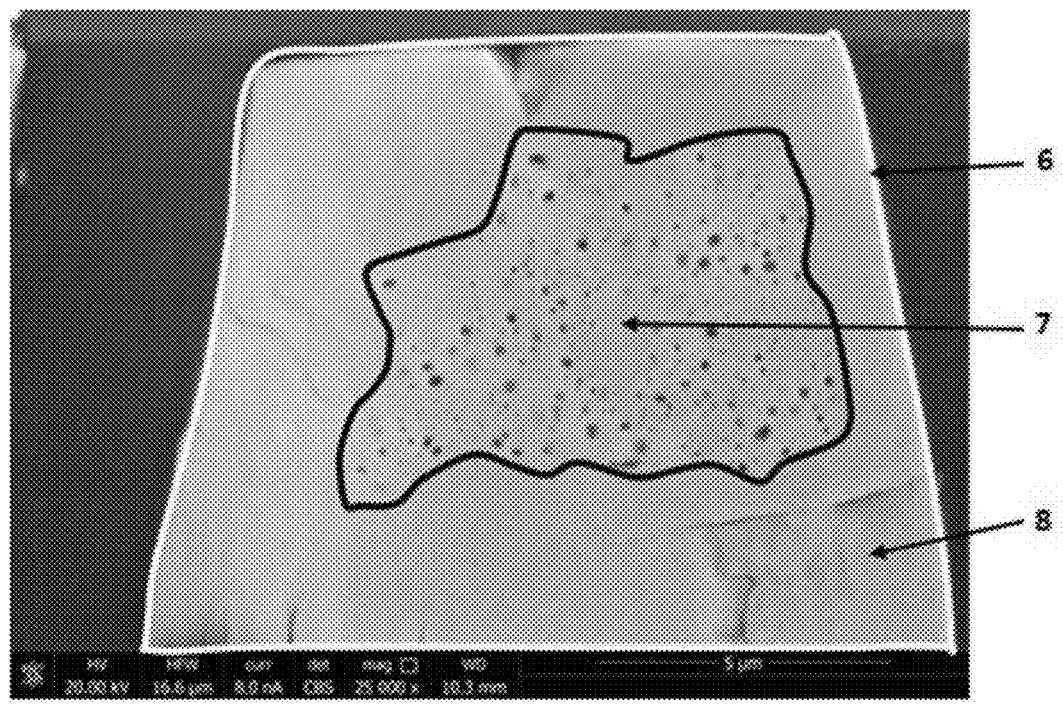
FIG. 3 presents the characteristic morphology of faceted tungsten carbide crystal within layer including irregular oval areas filled with an alloy based on metal.
Figure 19:
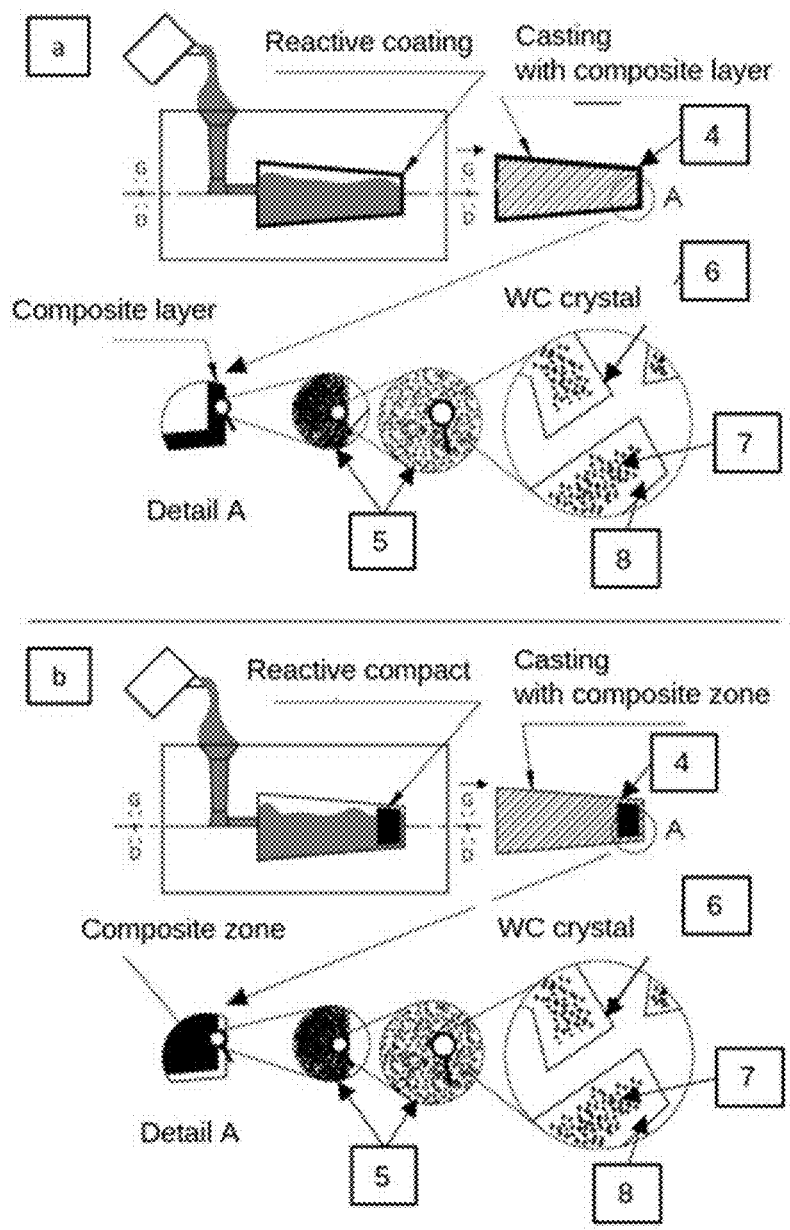
FIG. 19 presents schematic process of manufacture the composite material according to the invention within the layer of casting (a) and zone of casting (b).

According to one embodiment, the core 1 of the casting mould to produce the pump body 4 cast or Tee-section is coated with the reactive coating 2 using a sprayer 3, as shown in the FIGS. 2a and 2c. As a result, pump body 4 cast or Tee-section with the layer 5 comprising composite material (FIG. 2b, 2d) made in situ in produced with visible morphology of faceted tungsten carbide 6 consisting of two forms, one in the internal part of a particle containing irregular, round, oval areas filled with the alloy and another in the external part of a particle deprived of areas filled with the alloy 6, as shown in the FIG. 3. Diagram of the process of producing the coating is presented in FIG. 19a.

To form the layer 5 of WC reinforced composite in the internal surface of the pump body 4 or Tee-section subject to intense wear, core 1 of the casting mould was prepared. The reactive casting coating 2 is applied directly on the surface of the core 1 made of quartz sand and furan resin. The coating 2 is made by mixing tungsten powder of particle size ca. 5 μm and graphite powder of particle size ca. 5 μm. The mixture of the powders was made using 94% wt. of tungsten and 6% wt. of graphite. Then, the weighed amounts of powders were introduced into liquid solution of resin in the alcohol representing the carrier and air dried gluing agent. Mutual ratio of the tungsten and graphite powders mixture to liquid solution of gluing agent in both cases was 4:1 parts by weight. The whole was subject to mixing in order to obtain uniform reactive consistency of the cast reactive coating 2. The mixed reactive cast coating 2 was applied by means of a spray gun 3 on the casting core 1, representing the internal shape of the Tee-section 4. The coating was applied in layers until obtaining surface density 0.5 g/cm$^2$ and 0.45 g/cm$^2$. Then, the core 1 was installed within the mould cavity, and then each of the moulds was assembled and filled with liquid alloy of temperature 1380° C. Using the aforementioned method, a body 4 of the pump or Tee-section was made.

Figure 8:
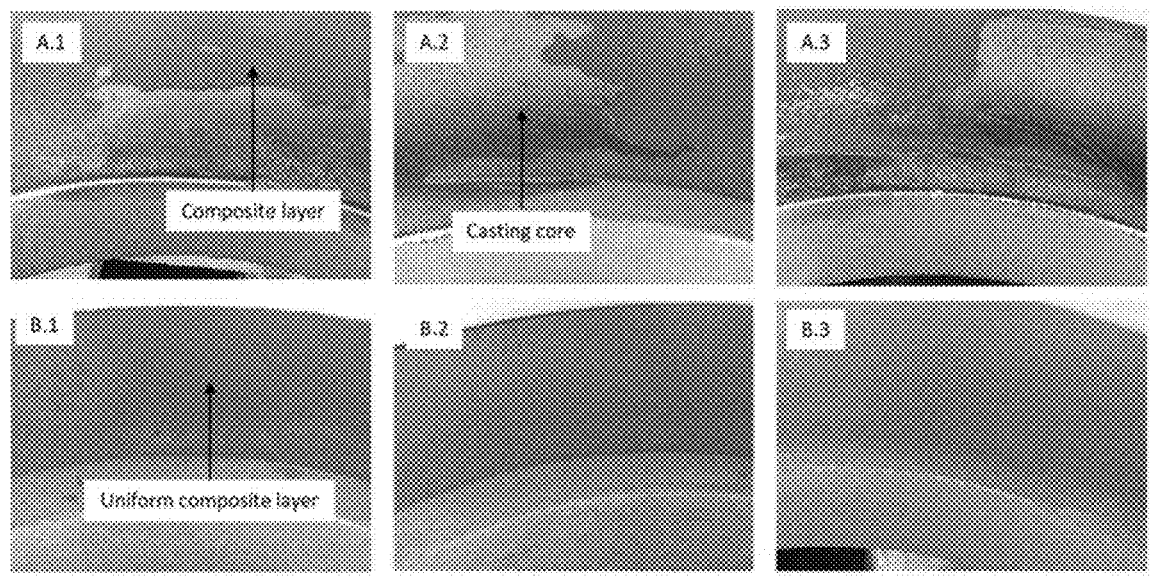
FIG. 8 presents photos of the grey iron cast with the composite layer made in situ, obtained with the use of different surface densities of the casting reactive coating according to the invention.

Body 4 of the pump manufactured using this method had the core area equal to ca. 3789 cm$^2$. In order to do that, a powder mixes of two different compositions were used, wherein one comprised 96% at. W and 4% wt. C, and the other one 94% wt. W and 6% wt. C. In both cases, the produced casts had base alloy with a microstructure characteristic for grey cast iron with separated flake graphite whose outer surface was reinforced with the composite layer 5 comprising tungsten carbide particles 6. Application of the cast cores 1 of the same area and similar surface density of the applied reactive cast coating 2 was intended and performed in order to show the impact of the applied stoichiometry of the powders mix on the continuity of the composite layer. The results are presented in the FIGS. 8 A.1-A.3 and B.1-B.3. The performed observations showed that the application of reactive casting coating 2 comprising the mixt of powders 96% at. W to 4% wt. C allowed for obtaining the continuity of the layer at the level ca. 80%, and in case of the mixture 94% wt. W to 6% wt. C specified in the patent application as designed for producing the in situ composite layer, characterized with the continuity at the level of 100%. In both types of pumps bodies 4, composite layers were made reinforced with WC, using reactive cast coatings 2 of surface density given in Table 1, in order to obtain continuity at the level between 100% and 80% of the pump internal surface. This shows that together with the increase of share of atomic tungsten in the powders mixture, the synthesis reaction deteriorates resulting in lack of continuous composite layer. However, continuity of the layer at the level of 80% may be acceptable under certain industrial applications.

TABLE 1

| No. | Core surface [cm$^2$] | Mass fraction, [% wt.] W | Mass fraction, [% wt.] C | Surface density of the reactive cast coating [g/cm$^2$] | Weight of the applied coating [g] | Protective coating | Layer continuity [%] |
|---|---|---|---|---|---|---|---|
| 1. | 3247.52 | 94 | 6 | 0.29 | 1000 | not available | 100 |
| 2. | 3247.52 | 94 | 6 | 0.4 | 1300 | not available | 100 |
| 3. | 3789.62 | 94 | 6 | 0.29 | 1100 | not available | 100 |
| 4. | 3789.62 | 94 | 6 | 0.4 | 1500 | not available | 100 |
| 5. | 3789.62 | 94 | 6 | 0.5 | 1894.5 | not available | 100 |
| 6. | 3247.52 | 96 | 4 | 0.29 | 1000 | not available | 100 |
| 7. | 3247.52 | 96 | 4 | 0.4 | 1300 | not available | 100 |
| 8. | 3789.62 | 96 | 4 | 0.29 | 1100 | not available | 100 |
| 9. | 3789.62 | 96 | 4 | 0.4 | 1500 | not available | 100 |
| 10. | 3789.62 | 96 | 4 | 0.5 | 1894.5 | not available | 90 |
| 11. | 3247.52 | 96 | 4 | 0.5 | 1623.76 | not available | 90 |
| 12. | 3247.52 | 96 | 4 | 0.5 | 1623.76 | applied | 80 |
| 13. | 3247.52 | 96 | 4 | 0.6 | 1623.76 | not available | 80 |

Figure 4:
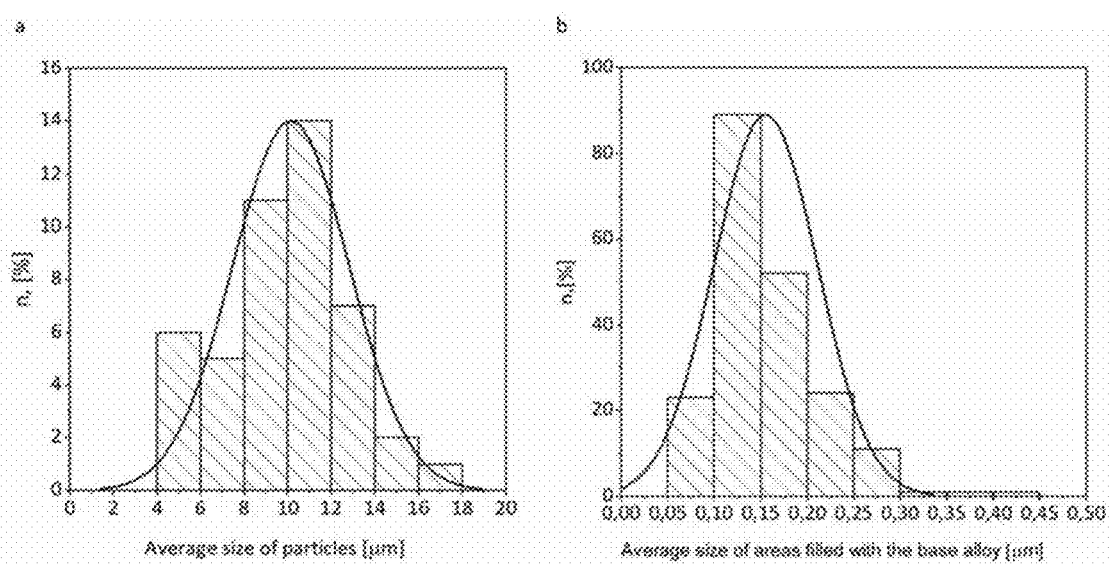
FIG. 4 presents histograms of the tungsten carbide particles/crystals size distribution as well as sizes of areas filled with the alloy within the area of individual particles/crystals of tungsten carbide.

As a result of the synthesis reaction, local composite reinforcements reinforced with particles of a t least one tungsten carbide type, are formed in the cast steel casting. The core 2 of the casting, after the crystallization process had the microstructure characteristic for the given grade of the cast steel, however the in situ crystals 6 are formed within the casting surface area. Such a crystal 6 has a morphology consisting of two different areas. One of the areas is within the internal part of the crystal 6 of tungsten carbide and comprises micro-areas 7 of shape similar to oval, filled with an alloy based on metal, and the other one is a rim 8 surrounding it deprived of oval micro-areas filled with alloy, as showed in the FIG. 3. Average particle size preferably is within the range from 4 to 18 μm, average size of areas filled with the base alloy is from 0.05 to 0.45 μm, as showed in the FIG. 4.

The wear index—determined using the Ball-on-disk method—of the layer 5 with composite material reinforced with tungsten carbide in the pump body 4 casting of grey cast iron with flake graphite, representing the base alloy, is from 5 to 8*10$^{-6}$ mm$^3$/N*m, and in the pump body 4 of grey cast iron with flake graphite representing the base alloy without the reinforcement layer is 37.6*10$^{-6}$ mm$^3$/N*m. I.e. the layer with the composite material according to the invention wear from 4.7 to 7.5 times less comparing to the pomp made of grey cast iron.

Example 2

In the example of the wear resistant casting with the layer of composite material, the coating is made by mixing tungsten powder of particles size about 5 μm and graphite powder of particles size below 5 μm. The mixture of the powders was made using 96% wt. of tungsten and 4% wt. of graphite. Then, the weighed amounts of powders were introduced into liquid solution of resin in the alcohol representing the carrier and air dried gluing agent. Mutual ratio of the tungsten and graphite powders mixture to liquid solution of gluing agent in both cases was 4:1 parts by weight. The whole was subject to mixing in order to obtain uniform reactive consistency of the cast reactive coating 2. The mixed reactive cast coating 2 was applied by spraying with a spray gun 3 onto the casting mould cavity. The coating 2 was applied in layers until obtaining surface density at least 0.5 g/cm². Them the mould was assembled and filled with liquid alloy of manganese cast steel composition of the following content of the main alloying elements, 1.3% C, 0.6% Si, 12.2% Mn and the remaining of Fe.

Figure 1:
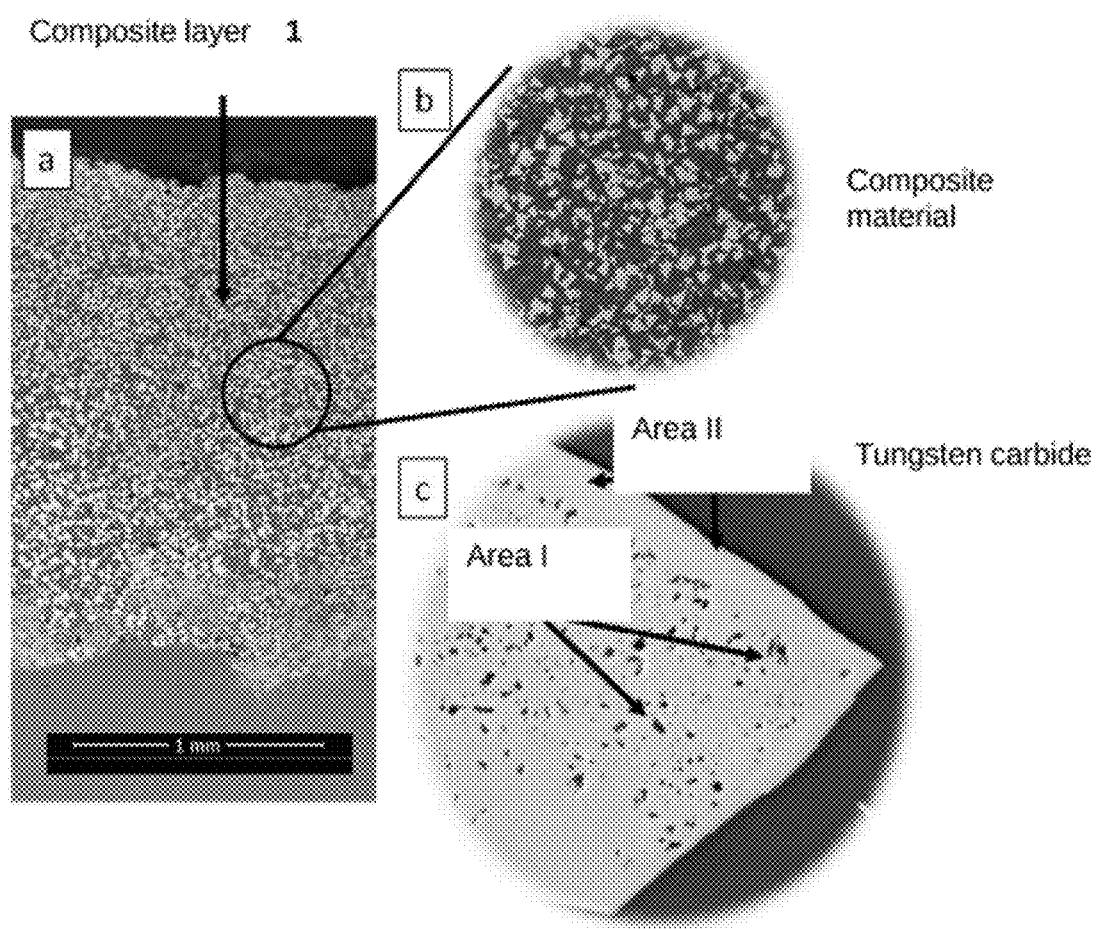
FIG. 1 presents a layer (a) of composite material (b) with tungsten carbide crystals/particles within the matrix based on the iron based alloy of characteristic morphology (c) comprising the area filled with an alloy present within the internal part of the crystal (area I) and area deprived of the areas filled with alloy within external part of the crystal (area II), manufactured using the reactive in situ cast coating.

The composite layer presented in the FIG. 1 of hardness 724 HV30 (1253 HV1), with the hardness of the basic alloy amounting ca. 247 HV30 (517 HV1) was obtained. The obtained parameters indicate achievement of hardness almost three-times higher than of wear resistant manganese cast steel.

Example 3

Figure 5:
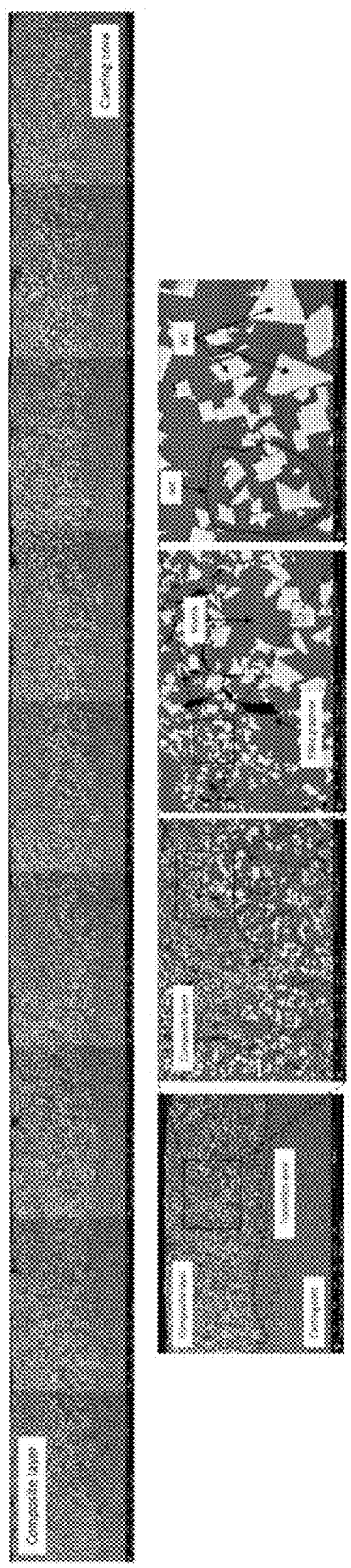
FIG. 5 presents the microstructure of the composite layer cross-section produced in situ in the casting, reinforced with tungsten carbide particles/crystals together with selected, magnified areas.
Figure 6:
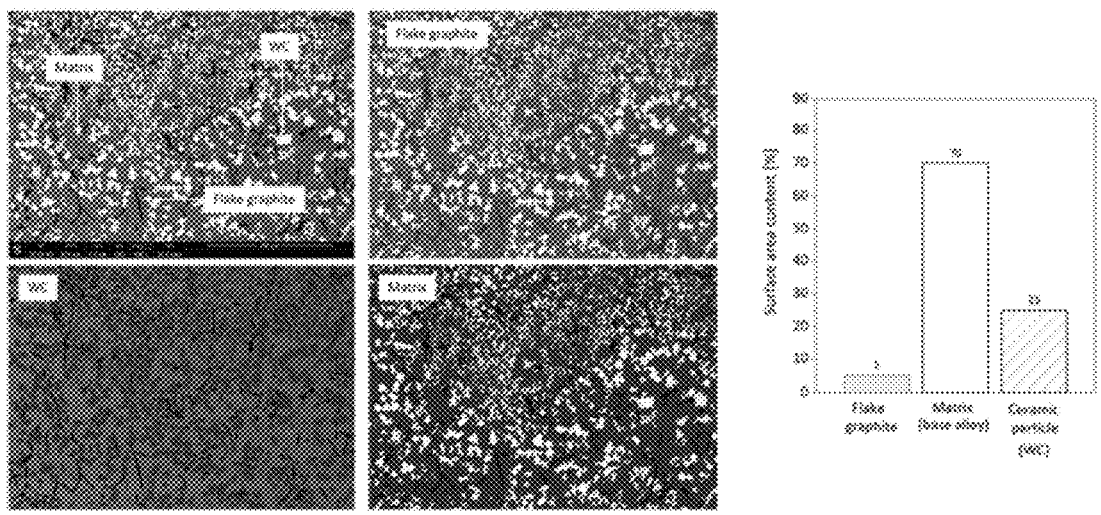
FIG. 6 presents exemplary microstructures of the layer with the composite with determined surface area content of the ceramic phase, i.e. tungsten carbide, matrix of the composite layer and graphite surface area content being the component of grey cast iron used to produce the cast.
Figure 7:
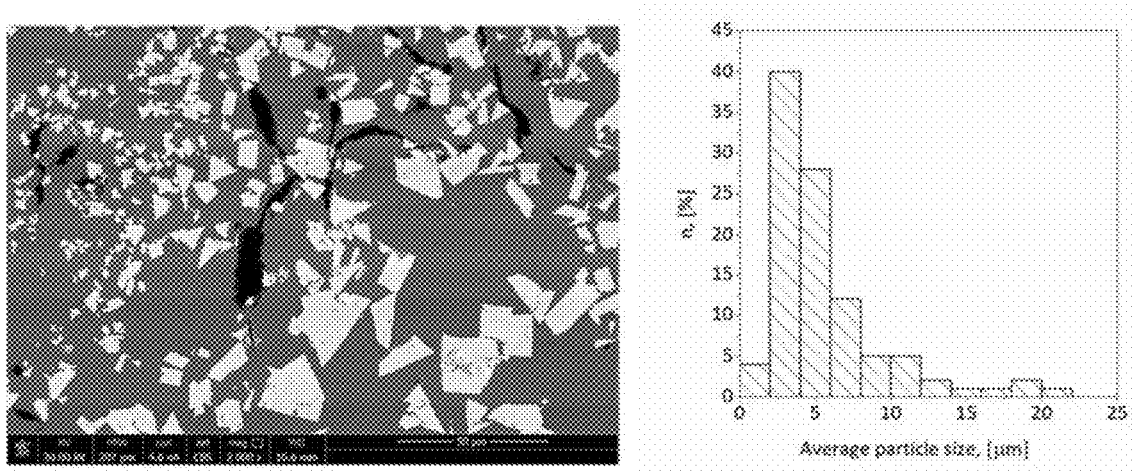
FIG. 7 presents the microstructure of the composite layer as well as average size of tungsten carbide particles determined as its two diagonals intersecting at the right angle.

In order to produce the in situ composite layer 5 reinforced with WC, the sand core of the casting mould 1 was prepared, based on quartz sand and water glass blown with $CO_2$. The casting mould 1 cavity was coated with reactive casting coating 2. The coating 2 is made by mixing tungsten powder of particle size 5 μm and graphite powder of particle size ca. 5 μm. The mixture of the powders was made using 94% wt. of tungsten and 6% wt. of graphite. Then, the powders were introduced into liquid solution of colophony in the alcohol representing the carrier and air dried gluing agent. Mutual ratio of the tungsten and graphite powders mixture to liquid gluing agent was 4:1 parts by weight. The whole was subject to mixing in order to obtain uniform reactive consistency of the cast reactive coating 2. The mixed reactive casting coating 2 was applied by spraying with a spray gun 3. The coating 2 was applied in layers until obtaining surface density 0.29 g/cm² or 0.4 g/cm². Then, the casting mould cavity was dried in order to remove residues of alcohol and moisture follow by filling with liquid alloy at temperature ca. 1400° C. The cast, after the crystallization process had the microstructure of grey cast iron with flake graphite, however within the area of composite layer, the in situ crystals 6 and/or WC particles were formed, having a structure formed of two different areas. One of the areas is within the internal part of the crystal 6 or WC particle and comprises micro-areas 7 of shape similar to oval, filled with an alloy based on metal, and the other one is a rim 8 surrounding it deprived of oval micro-areas filled with alloy. The cross-section of the layer with the selected magnified areas is presented in the FIG. 5. In order to assess the share of the reinforcing phase, one determined surface area content of phases identified within microstructure, i.e. flake graphite and base alloy representing the matrix of the composite layer and tungsten carbide representing the reinforcement phase. Exemplary microstructures with determined surface share and the obtained results are presented in the FIG. 6. Surface share of tungsten carbides in this case is 25% and of the matrix 70%, the rest is graphite being the component of the basic alloy used to produce the cast. Moreover, average tungsten carbide particle size was estimated and it was determined as an average of two measurements of diagonals intersected at the right angle. The results show to bimodal size distribution of tungsten carbide within the composite layer that achieves the first distribution maximum for the distribution from 0.5 to 6 μm, and the other from 7 to 30 μm. The results are presented in the form of a histogram, as showed in the FIG. 7.

Example 4

Figure 9:
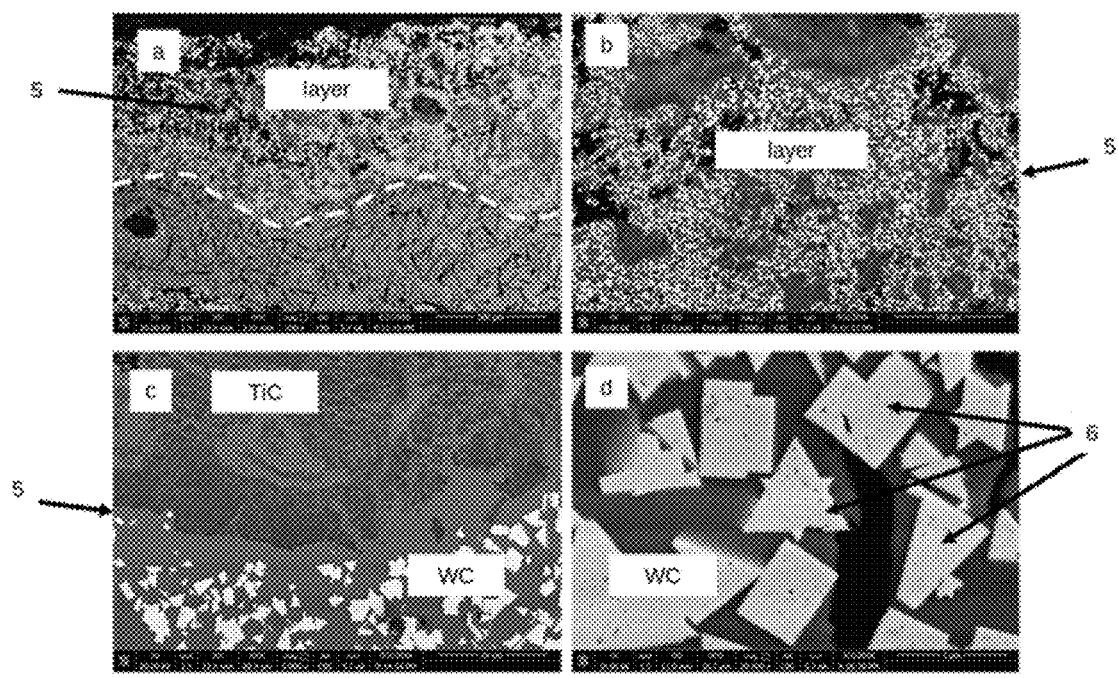
FIG. 9 presents the microstructure of the in situ composite layer produced using the mix of reactants of the reaction forming two types of carbide (tungsten and titanium), subject to self-propagating high-temperature synthesis reaction.
Figure 10:
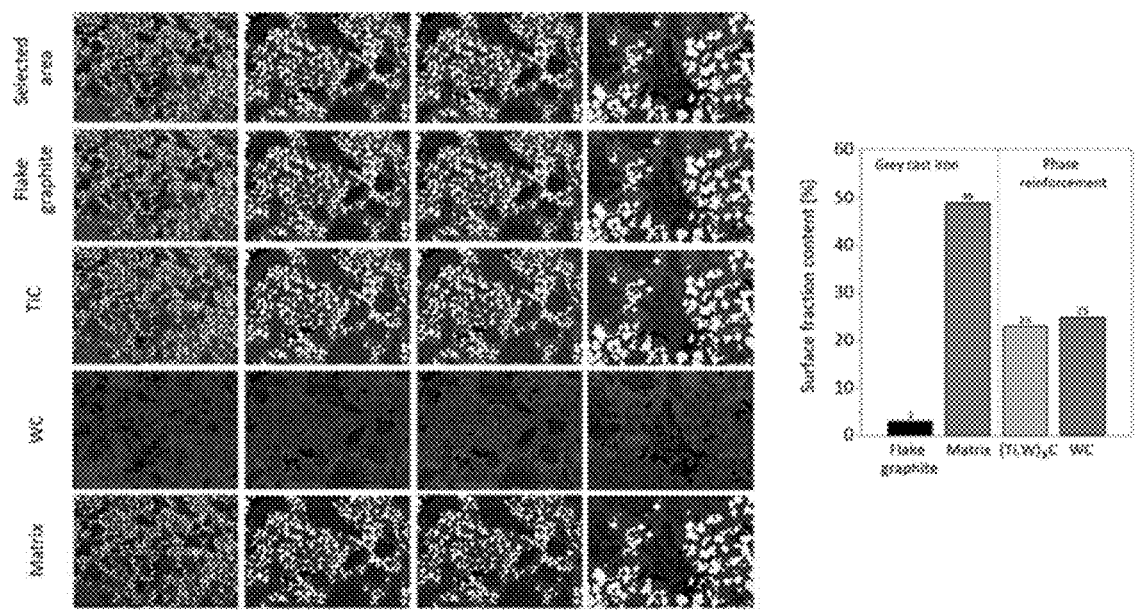
FIG. 10 presents the surface area content of individual phases representing the microstructure of the in situ composite layer produced using the mix of substrate mix of the reaction forming two types of carbide (tungsten and titanium), subject to self-propagating high-temperature synthesis reaction.

In order to produce internal layer of the pump body 4 that is subject to intense wear, the layers 5 comprising the composite material reinforced with ceramic phases particles, such as tungsten and titanium carbides, the mould core 1 was prepared. The reactive casting coating 2 was applied directly on the surface of the core 1 made of quartz sand and water glass and blown with $CO_2$. The coating 2 was made based on mixing 80% wt. of reaction substrates forming tungsten carbide and 20% wt. of reaction substrates forming titanium carbide. The mixture of powders of reaction substrates forming tungsten carbide was made in the weight ratio W:C equal to 94:6% wt. Reaction substrates forming TiC were prepared in atomic ratio of Ti:C equal to 55:45%. In this case, the following powders were used: tungsten of microcrystalline morphology and particle size ca. 4.5 μm, titanium of spongy morphology of particle size 44 μm and graphite of flake morphology of particle size below 5 μm. The prepared mixture of powders was introduced into liquid solution of colophony resin in ethyl alcohol representing the carrier and air dried gluing agent. Mutual ratio of the tungsten and graphite powders to liquid gluing agent was 4:1 parts by weight. The casting coating was prepared based on 600 g of powders mixture and 150 g of solution. The whole was subject to mixing in order to obtain uniform reactive consistency of the cast reactive coating 2. The mixed reactive casting coating 2 was applied by spraying with a spray gun 3. Then, the core 1 together with the applied reactive casting coating 2 was dried at temperature above 100° C. in order to remove residues of alcohol and moisture. The core 1 was installed inside the casting mould cavity, and then the mould was assembled and filled with liquid alloy. The casting 4, after the crystallization process had the microstructure of grey cast iron with flake graphite, however within the composite layer 5 area, the in situ particles of tungsten and titanium carbides were formed (FIG. 9). The obtained microstructure were used to determine the surface share of individual phases representing microstructure of the produced in situ composite layer. The results are showed in the FIG. 10 considering the division of phases present within the area of the matrix and composite layer. The presence of non-faceted particles of TiC within the microstructure indicates the addition of percentage share of pure TiC formation reaction substrates. Hardness test performed using Vickers method (HV1) under the load of 1 kG i.e. 9.81 N within the area of the base alloy and the composite layer showed the values at the level of 312.3 HV1 and 767.1 HV1 respectively. The obtained results indicate over twice increase of hardness of the outer layer of the cast made together with the in situ composite layer.

Example 5

In this example, the purpose was to bind the composite coating surface density and thickness of the cast wall as a parameter affecting the course and effectiveness of the tungsten carbide synthesis reaction. The performed observations indicated that application of mutual ratio of powders W:C amounting 96:4% wt. is less favourable than 94:6% wt. therefore, within another experiment, one used the composition of W:C equal to 94:6% wt. Powders, with such a composition, were introduced into liquid solution of colophony in the alcohol representing the carrier and air dried gluing agent. Mutual ratio of the tungsten and graphite powders mixture to liquid gluing agent was 4:1 parts by weight. The whole was subject to mixing in order to obtain uniform reactive consistency of the cast reactive coating 2. The mixed reactive casting coating 2 was applied by spraying with a spray gun 3.

Figure 11:
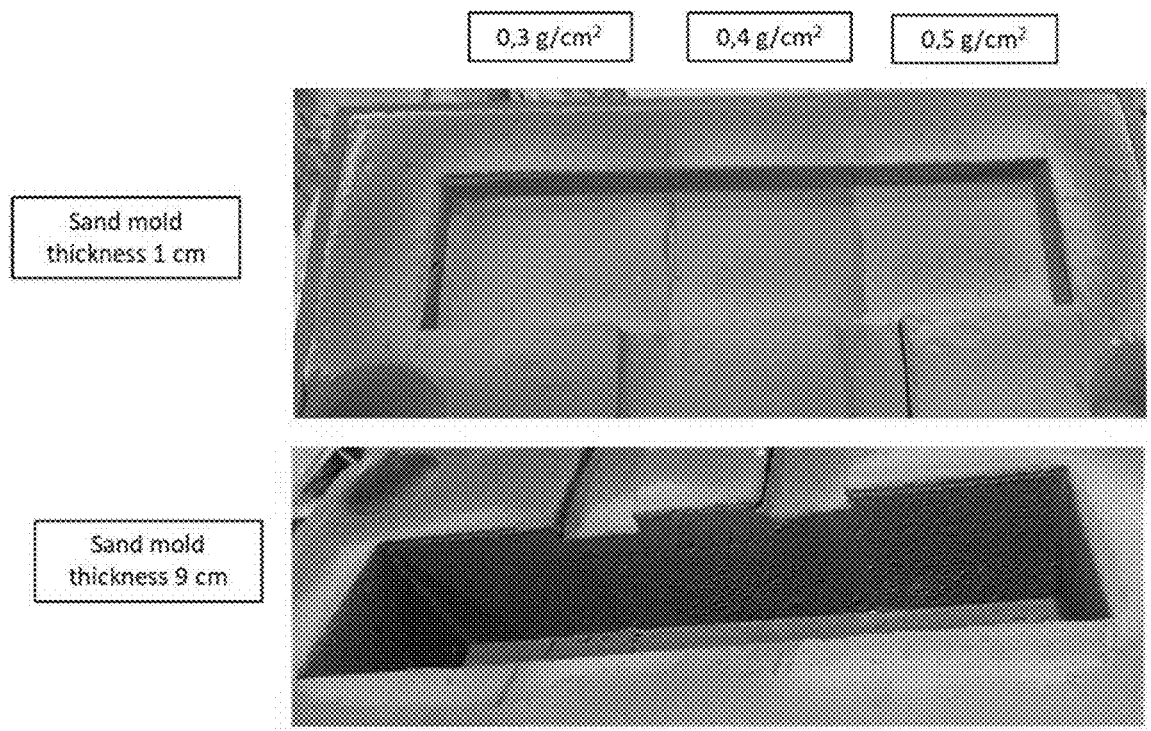
FIG. 11 presents photos of the casting mould cavities with the reactive casting coatings applied on their surfaces for the in situ synthesis of composite layers reinforced with tungsten carbide.
Figure 12:
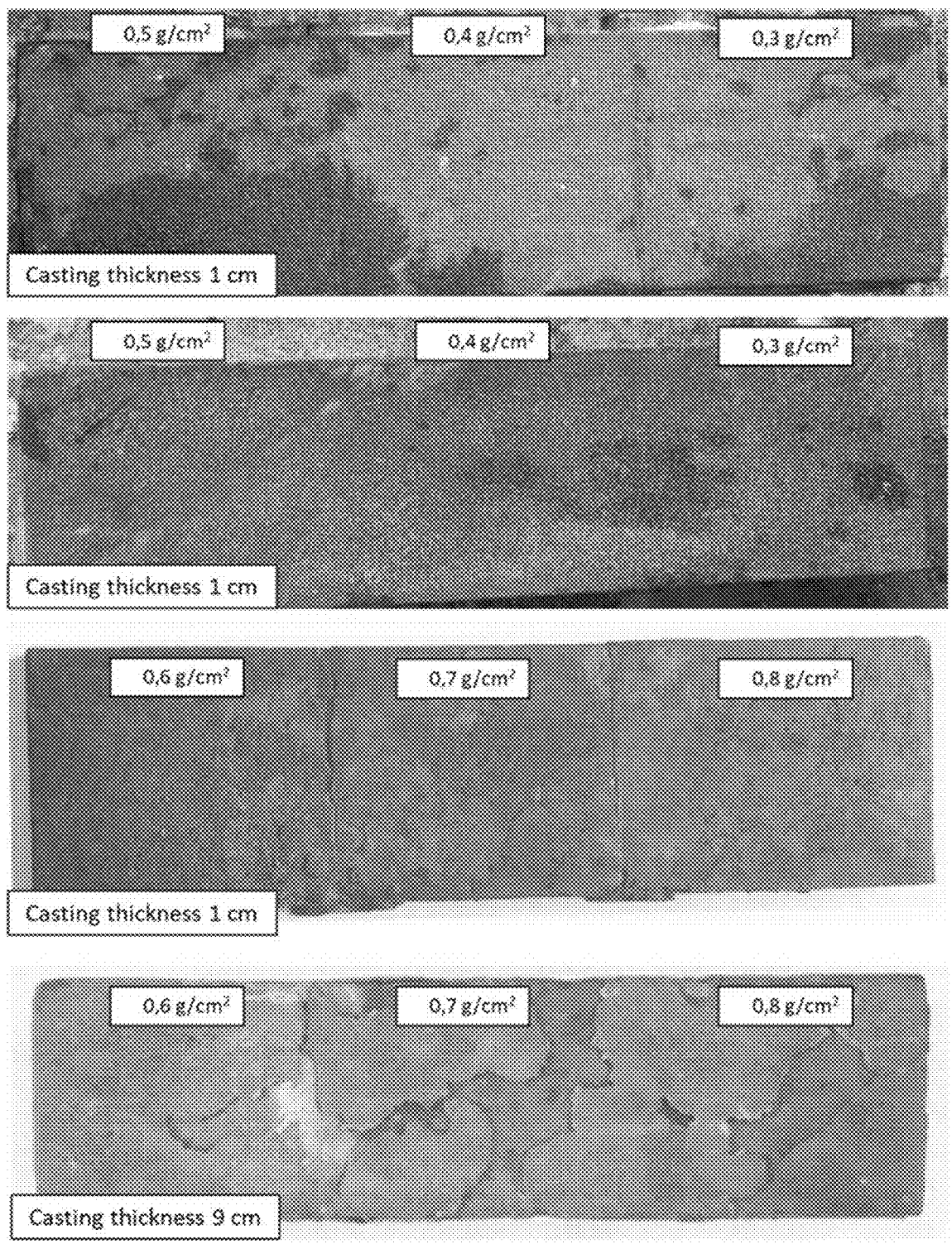
FIG. 12 presents the effect of surface density of the reactive cast coating on the macrostructure of the in situ produced composite layer reinforced with tungsten carbide in the casting of slabs of different thickness.

Casting moulds were prepared to produce casts of slabs of thickness 10 and 90 mm, wherein each of the cavities was divided to three equal parts. Each of the separated areas of the sand mould was covered with the cast coating until obtaining the surface density 0.3 g/cm$^2$, 0.4 g/cm$^2$, 0.5 g/cm$^2$, 0.6 g/cm$^2$, 0.7 g/cm$^2$ and 0.8 g/cm$^2$, as showed in the FIG. 11. In turn, FIG. 12 presents macrostructure of the castings with in situ produced composite layers. The observations of the casts macrostructure indicate that in case of surface density 0.3 g/cm$^2$, 0.4 g/cm$^2$ and 0.5 g/cm$^2$ it is possible to obtain a cast of continuous operating surface reinforced with a composite layer without any significant impact of the cast wall thickness. In case of increasing the amount of the applied coating to 0.6 g/cm$^2$, 0.7 g/cm$^2$ and 0.8 g/cm$^2$ respectively for the thin-walled cast of wall thickness 10 mm, one may observe no synthesis reaction—lack of the composite layer on the cast surface. In case of the cast of wall thickness 90 mm, the macrostructure has areas deprived of the composite layer, which characterized with a structure similar to a "shell". Application of surface density of the reactive cast coating 2 between 0.6 g/cm$^2$-0.8 g/cm$^2$ results in lack of full infiltration due to missing enough energy for the in situ WC synthesis reaction to take place. It is to be noted that this result is related to casts of small dimensions and low weight, which should not limit the cases of casts with higher weight, wherein the use of higher surface densities of the reactive cast coatings 2 allows for obtaining continuous composite layer.

Example 6

Figure 13:
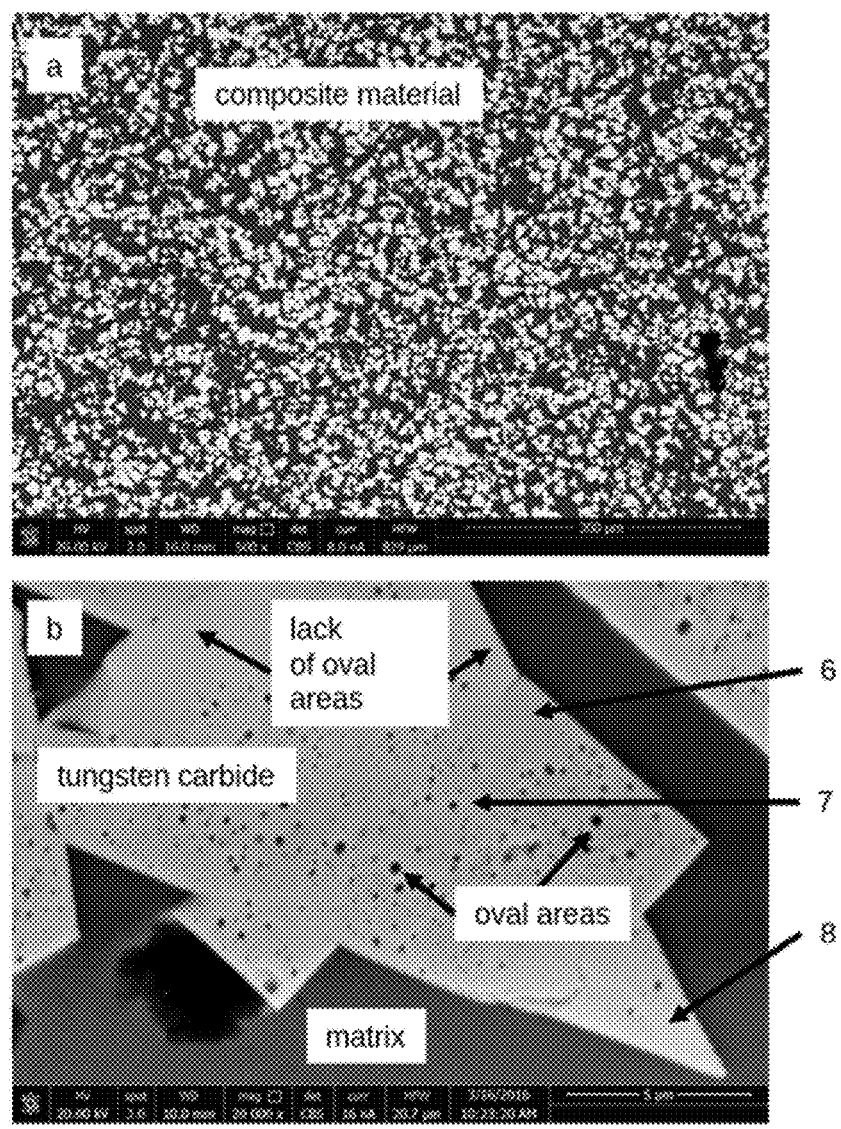
FIG. 13 presents a microstructure of the composite material using the reactive compact (a) in the cast of cast steel comprising carbide crystals of characteristic morphology (b) comprising irregular oval areas filled with an alloy and areas deprived of them.

In the embodiment using the reactive compact, local composite reinforcements were provided, reinforced with at least one type of tungsten carbide in the form of crystals/particles. In order to do that, a mix of powders of tungsten and carbon was prepared with the mass fraction of W:C equal to 90:10% wt. The size of tungsten and graphite particles was 4.5 μm and below 5 μm respectively. The prepared weighed amount of powders was mixed for 60 minutes and then dried at temperature 175° C. to evaporate the absorbed moisture. The prepared weighed amounts of powders of predetermined weight were pressed under pressure of 500 MPa using cold one-axis compaction. The prepared reactive casting pads were inserted into the casting mould and fixed to it at predetermined place using bolts. Then, it was filled with a casting iron based alloy—cast steel comprising 0.28% C, 1.85% Cr, 0.6% Mn, 1.58% Si and the rest was Fe (GS30) at temperature 1580° C. The reaction between tungsten and carbide is initiated by supplying heat energy via the liquid casting alloy. Due to the synthesis reaction, the composite zone was formed reinforced with particles/crystals of at least one type of tungsten carbide. The core of the casting, after the crystallization process had the microstructure characteristic for the given grade of the cast steel, however the in situ crystals are formed within the casting pad area. Crystals 6 and/or particles have morphology composed of two different areas. One of the areas is within the internal part of the crystal 6 and/or particle of tungsten carbide and comprises micro-areas 7 of shape similar to oval, filled with an alloy based on metal, and the other one is a thin rim 8 surrounding it deprived of oval micro-areas filled with alloy, as showed in the FIG. 13b.

Example 7

Figure 14:
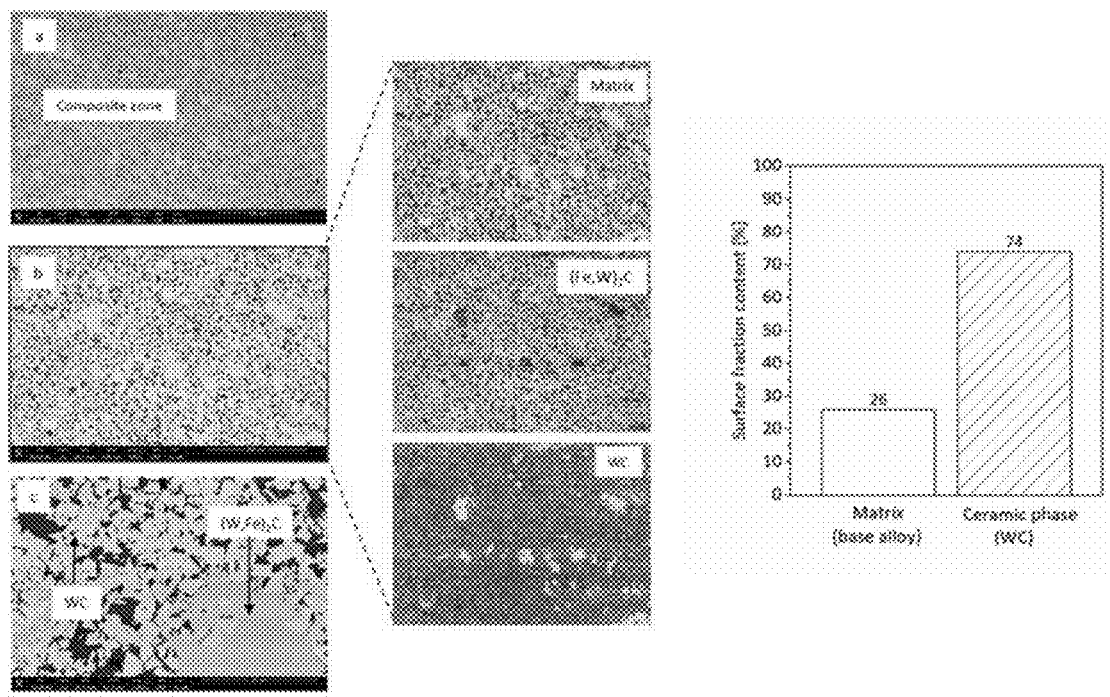
FIG. 14 presents a microstructure of the composite material having crystals/particles of tungsten carbide together with the graph presenting the following surface area content of: ceramic phase in the form of different types of tungsten carbide and metal composite matrix.
Figure 15:
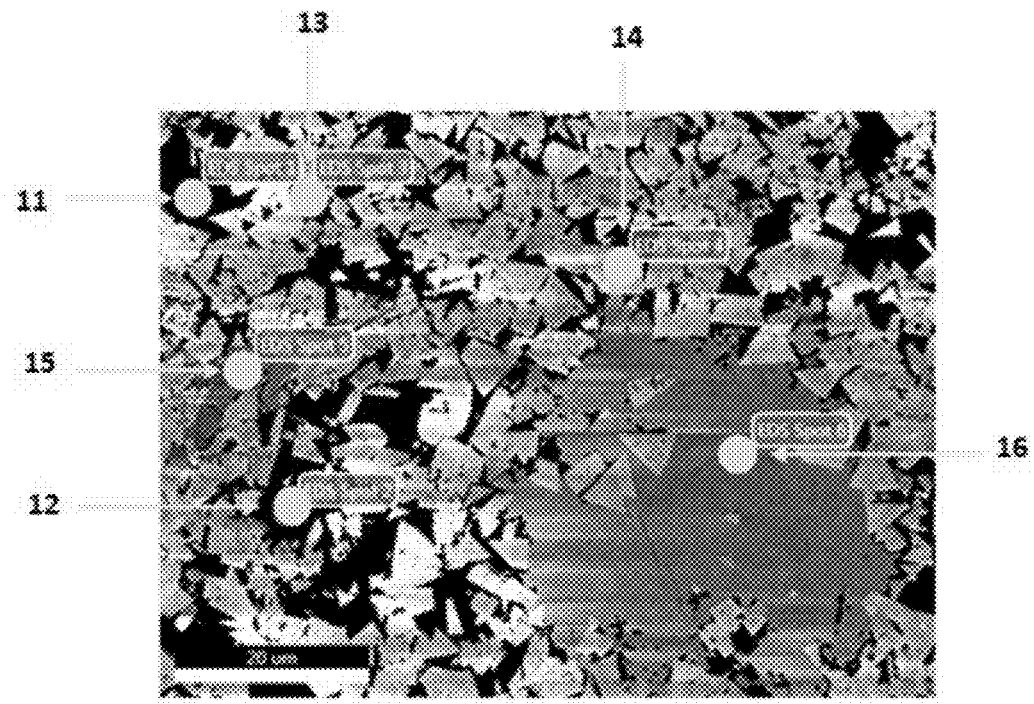
FIG. 15 presents a microstructure of particles/crystals of different types of tungsten carbide structure, including WC type carbide.

Another experiment was performed that was similar to example 6, however the mass fraction of tungsten to graphite powders was 94:6% wt., and the temperature of filling was 1560° C. and the pressure of pressing 500 MPa. After the synthesis reaction in the casting mould, one obtained the volume of the reinforced phase at the maximum level amounting ca. 74% (FIG. 14). As presented in the FIG. 15, the microstructure of the composite zone area can be characterized by the presence of tungsten carbide WC of characteristic morphology presented in the FIG. 13b and carbide type W$_2$Fe$_2$C. In order to verify the chemical composition, tests were performed using an energy dispersive x-ray microanalysis. In case of the accepted research method, the mass fraction of carbon must be treated qualitatively only, not quantitatively. The results of measurements within individual items are presented in Table 2. The produced cast weighed ca. 1.5 kg.

TABLE 2

| | | Chemical composition, % wt. | | | | |
|---|---|---|---|---|---|---|
| Point | C | Cr | Fe | W | Mn | Si |
| 11 | — | 1.2 | 91.0 | 7.1 | 0.6 | — |
| 12 | — | 1.2 | 91.9 | 5.1 | 0.6 | 1.2 |
| 13 | 1.8 | — | 3.3 | 94.9 | — | — |
| 14 | 2.1 | — | 2.5 | 95.4 | — | — |
| 15 | 0.8 | 1.1 | 24.5 | 73.6 | — | — |
| 16 | 0.8 | 1.1 | 25.7 | 72.4 | — | — |

One obtained the composite zone of hardness above 1100 HV30 (FIG. 16, WC—type 2), with the hardness of the base alloy amounting ca. 250-300 HV30. The obtained parameters indicate the achievement of harness comparable to solutions known in the art that consist in synthesis within the castings, wherein composite zones are produced based on titanium carbide, wherein the zone have hardness from ca. 500 to 1200 HV30 (FIG. 16), however, in the solution according to the invention, a uniform distribution of hardness within the whole zone was unexpectedly achieved, as manifested by low value of standard deviation showed in the FIG. 16.

Figure 17:
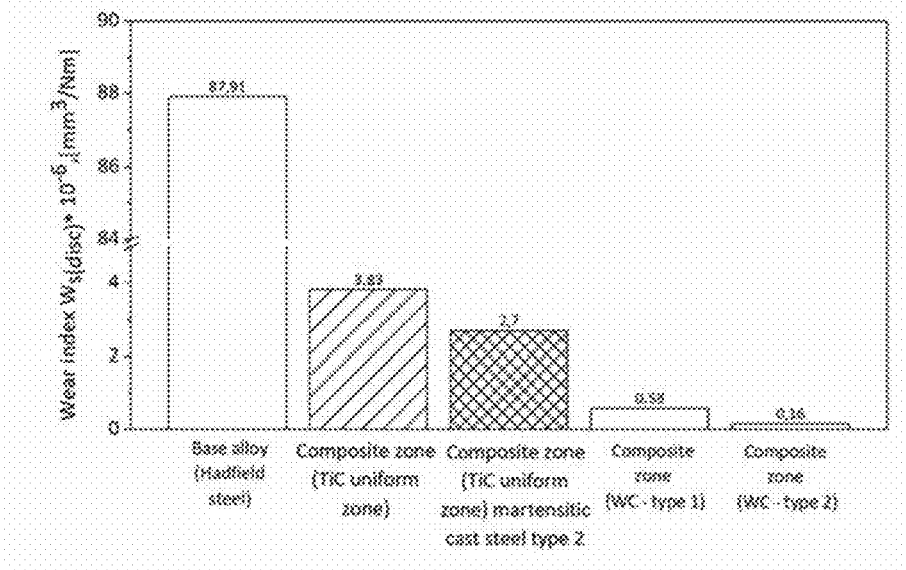
FIG. 17 presents comparative results of abrasive wear composite zones according to the invention with the wear resistant reference casting alloy of reinforced manganese cast steel as well as composite material reinforced with titanium carbide (TiC) particles made in situ within the casting.

As result of the performed experiments, a material of exceptional wear resistance was unexpectedly obtained, where the abrasive wear index, determined using the Ball-on-disk method was 0.16*10 mm$^3$/N*m (FIG. 17, WC—type 2) in relation to materials known in the art manufactured using the in situ synthesis technique in castings using reactive components, wherein in case of the selected materials, the abrasive wear index was 2.7 to 3.83*10$^{-6}$ mm$^3$/N*m (FIG. 17).

Example 8

In this case, the purpose was to form local composite reinforcements within the slab casting. In order to do that, a mix of powders was prepared comprising WC reagents, which was pressed under pressure 450 MPa. The chemical composition of the mix was prepared with the percentage share W:C amounting 94:6% wt. Dimensions of the slab 300 mm, thickness ca. 30 mm and width 75 mm. The casting pads of thickness 5 mm were installed within the casting mould cavity at the locations of the highest wear using metal elements representing an installation system. To initiate the WC synthesis reaction, the ready casting mould cavity was filled with alloying cast steel of higher manganese content. As a result, slab cast locally reinforced with composite zones based on Fe were obtained.

Figure 16:
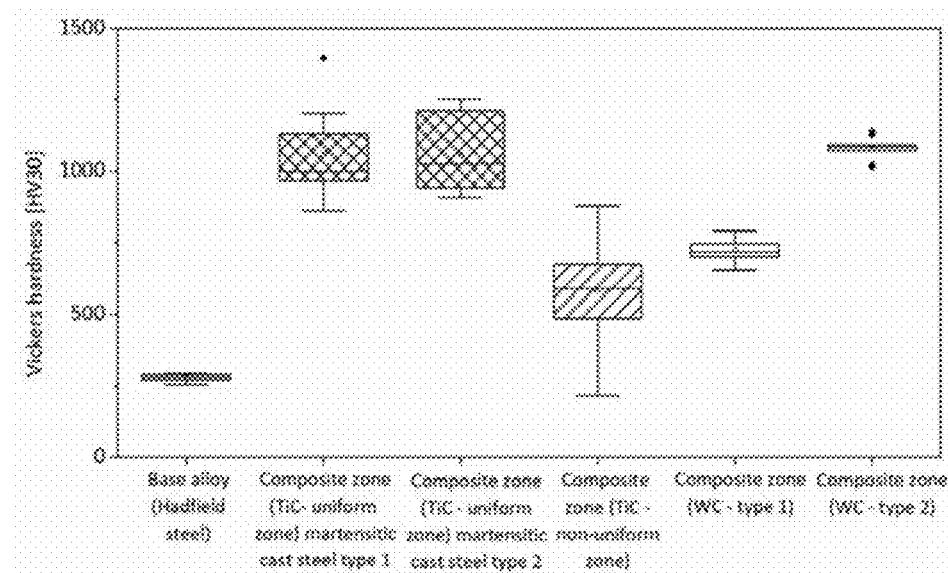
FIG. 16 presents comparative results of hardness of composite zones according to the invention with the wear resistant reference casting alloy of reinforced manganese cast steel as well as composite material reinforced with titanium carbide (TiC) particles made in situ within the casting.

One obtained the composite zone of hardness above ca. 750 HV30 (FIG. 16, WC—type 1), with the hardness of the basic alloy ca. 250-300 HV30, and after hardening 400-500 HV30 (data not included in the FIG. 16). The obtained parameters indicate the achievement of harness comparable to solutions known in the art that consist in synthesis within the castings, wherein composite zones are produced based on titanium carbide, wherein the zone have hardness from ca. 500 to 1200 HV30 (FIG. 16), however, in the solution according to the invention, a uniform distribution of hardness within the whole zone was unexpectedly achieved, as manifested by low value of standard deviation showed in the FIG. 16.

As result of the performed experiments, a material of exceptional wear resistance was unexpectedly obtained, where the abrasive wear index, determined using the Ball-on-disk method was $0.58*10^{-6}$ mm$^3$/N*m (FIG. 17, WC—type 1) in relation to materials known in the art manufactured using the in situ synthesis technique in castings using reactive components, wherein in case of the selected materials, the abrasive wear index was 2.7 to $3.83*10^{-6}$ mm$^3$/N*m (FIG. 17).

Figure 18:
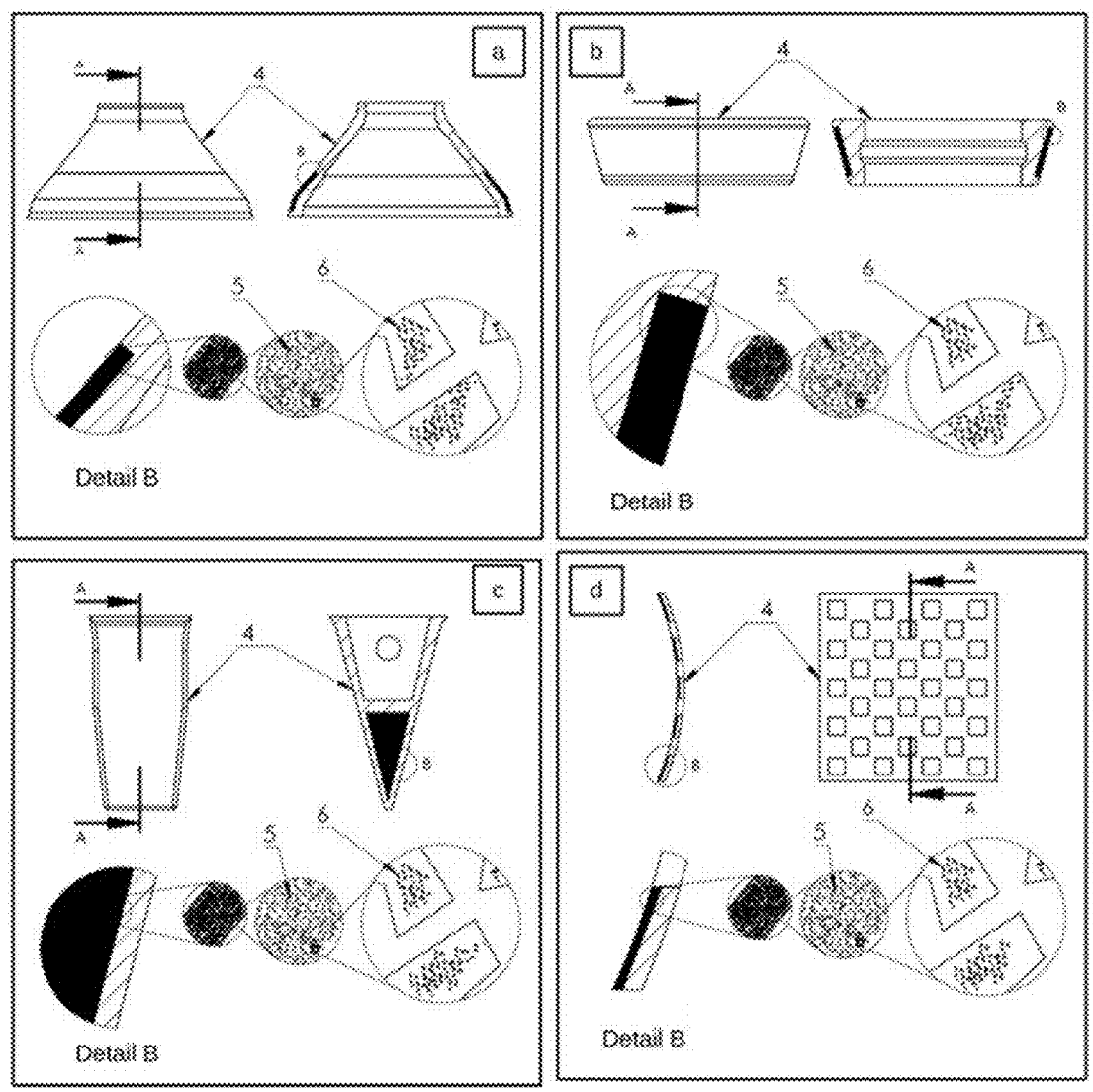
FIG. 18 presents exemplary diagrams of structural elements and their cross-sections with the in situ produced zones comprising the composite material with crystals and/or particles of tungsten carbide of specific morphology according to the invention.

Exemplary diagrams of the structural elements comprising the in situ produced composite zone, wherein the zone comprises the composite material according to the invention, wherein crystals and/or particles of tungsten carbide of specific morphology are present, are showed in the FIG. 18. The presented diagrams do not limit the area of application in case of producing other cast structural elements.

The invention claimed is:

1. A method of producing a composite material having at least one of a composite layer and a composite zone based on in situ produced alloys reinforced with tungsten carbide in the form of at least one of crystals and particles, wherein a microstructure of the composite material within at least one of a composite layer and a composite zone comprises at least one of faceted crystals and faceted particles of tungsten carbide that provide uniform macroscopic and microscopic distribution, wherein the at least one of crystals and particles of tungsten carbide include at least one selected from the group consisting of irregular, round, oval nano, and micro-areas filled with alloy based on metal in the form of at least one of the composite layer and the composite zone, comprising the following steps:
   a) preparation of a mix of powders,
   b) pressing the powders mix in a form of a casting mould compacts, which can have different forms, especially granules, briquettes, or preforms,
   c) insertion of at least one casting compact within the mould cavity using installation elements,
   d) pouring the mould cavity with an alloy, wherein heat supplied by the liquid alloy in a form of high temperature provides energy necessary to initiate the in situ reaction of a ceramic phase in a form of at least one type of tungsten carbide or tungsten carbide with addition of other types of carbides that are subject to self-propagating high temperature synthesis reaction and represent a catalyst for the tungsten carbide synthesis reaction, and
   wherein the mix of powders includes at least one of tungsten between 90-97% wt. and carbon within the range from 3 to 10% wt, the mix of powders does not include a moderator powder and comprises a substrate of reaction that forms the tungsten carbide.

2. The method according to claim 1, wherein pressure of the reagent pressing is between 100 and 650 MPa, wherein when the pressure is obtained using at least one of compaction methods, cold isostatic pressing, one or two-axis cold pressing.

3. The method according to claim 1, wherein the mix of powders comprises tungsten within a scope of 93-95 wt. % and carbon within a scope of 5-7 wt. %.

4. The method according to claim 1, wherein the mix of powders comprises tungsten in the amount of 94 wt. % and carbon in the form of graphite in the amount of 6 wt %.

* * * * *